United States Patent [19]

Sonnenberg

[11] 4,183,057
[45] Jan. 8, 1980

[54] ACTUATING SYSTEM FOR A RENTAL TELEVISION

[76] Inventor: Charles Sonnenberg, 1031 Chesworth St., Philadelphia, Pa. 19115

[21] Appl. No.: 916,521

[22] Filed: Jun. 19, 1978

[51] Int. Cl.² .................................................. H04N 7/16
[52] U.S. Cl. ...................................... 358/114; 200/44; 361/114
[58] Field of Search ........................ 358/114, 115, 84; 361/100, 114, 115; 200/44

[56] References Cited

U.S. PATENT DOCUMENTS

| | | | |
|---|---|---|---|
| 2,856,474 | 10/1958 | Norris | 200/44 |
| 3,188,384 | 6/1965 | Townsend | 358/84 |
| 3,335,421 | 8/1967 | Sargent, Jr. et al. | 358/115 |
| 3,631,444 | 12/1971 | Daniel | 200/44 |
| 3,886,302 | 5/1975 | Kosco | 358/114 |

*Primary Examiner*—S. C. Buczinski
*Attorney, Agent, or Firm*—LeBlanc, Nolan, Shur & Nies

[57] ABSTRACT

A television system specially constructed for rental use. Such a television system generally includes a key actuated switching system. When the key actuated system is turned on, it enables the televsion to be normally operated. Often, however, there is a desire to enable the user to actuate the television without having to wait for the operator who has the key for the key actuating system. For this purpose, the television system includes an override switching system which enables the television to be operated without the necessity of turning on the key actuating switch. When the override switch is actuated, an indicating signal is generated so as to indicate that the television is in use.

6 Claims, 2 Drawing Figures

ACTUATING SYSTEM FOR A RENTAL TELEVISION

BACKGROUND OF THE INVENTION

The present invention relates to a television system specially constructed for rental use, in particular for use in institutions such as hospitals.

Television systems which are placed within each room in a hospital can be rented by the users of the room for a daily charge. Typically, an employee of the company managing the televisions within the hospital will come around to see each patient on a daily basis to see if the patient desires to rent the television. If the patient so desires, then the television system is turned on by a key operated actuating switch. Often, the patient will enter the hospital at a time when the key operator is unavailable. Under such circumstances it is necessary for the patient to wait until the key operator is available, which often can be the next day.

The delay in initiation of the rental period causes a loss in rental income for the owner-operators of the television systems. In addition, it results in inconvenience to the patients.

SUMMARY OF THE INVENTION

An object of the present invention is to provide an improved rental television system that overcomes the drawbacks of those prior systems as discussed above.

Another object of the present invention is to provide a rental television system having an override switching system for enabling the user of the system to override the key operated actuating switch of the rental television.

A further object of the present invention is to provide an override switching system for use with a rental television system for enabling the user to override the key operated actuating switch normally used for activating the television system.

A television system constructed in accordance with the present invention includes a key operated actuating switch which can be switched between an off position for preventing normal operation of the television and on position which enables the television to be operated. The television system also includes an override switching device which is capable of being switched from a normal position to an actuated position for overriding the key operated switch and enabling the television to be operated without having the key operated switch switched into its on position. The system also includes an indicating device for indicating when the override switch has been actuated.

Throughout this application, reference is made to controlling the television system so as to enable normal operation. The reference to normal operation refers to that operation which enables the user to be able to view programs on all channels received within the geographical area. Often, even without turning on the key operated switch in the television system, it is possible for the user to be able to view programs on one selected channel of the television. Often, hospitals will provide educational programs on one selected channel for use by all patients without incurring any expense.

More specifically, the improved rental television system constructed in accordance with the present invention has an actuating system including the key operated switch, an override switching system which enables the key operated switch to be overridden and an indicating mechanism for providing an indicating signal when the override switching system has been actuated. The key operated switch is switchable between an off position for preventing normal operation of the television and an on position for enabling the television to be operated. The override switching system is capable of being switched from a normal position to an actuated position for overriding the key operated switch when it is in its off position and enabling the television to be operated. The indicating mechanism provides an appropriate indicating signal, such as the activation of a light, when the override switching system has been actuated.

The indicating light remains on until the override switching system is deactivated. In this manner, the operator of the rental televisions when he makes his next round through the hospital will see the indicating light and then can visit the patient to sign the patient up for a normal rental period. In addition, it is possible for the operator to collect a fee for a time period commencing with the time at which the patient actuated the override switching system, thereby enabling the operator to collect a larger rental fee.

After the operator has signed up the patient for a specific rental period, the operator will activate the key operated switch. The system is constructed so that when the key operated switch is switched into its on position it automatically causes the override switching system to return to its normal position.

DESCRIPTION OF THE PREFERRED EMBODIMENT

Figure 1:
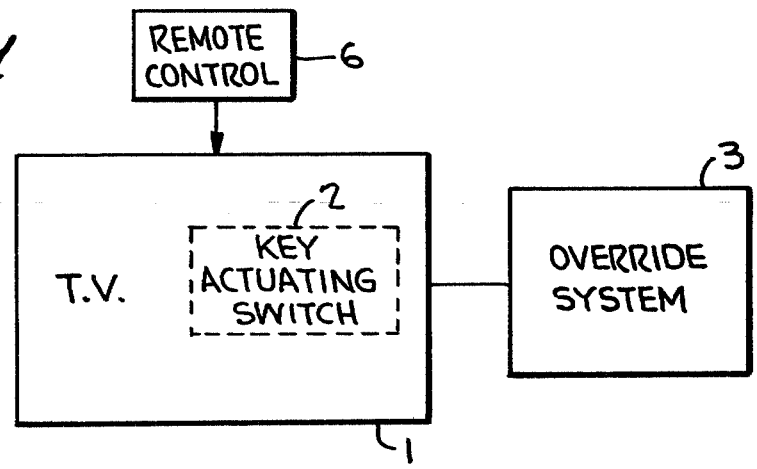
FIG. 1 is a block diagram illustrating a television system constructed in accordance with the present invention.
Figure 2:
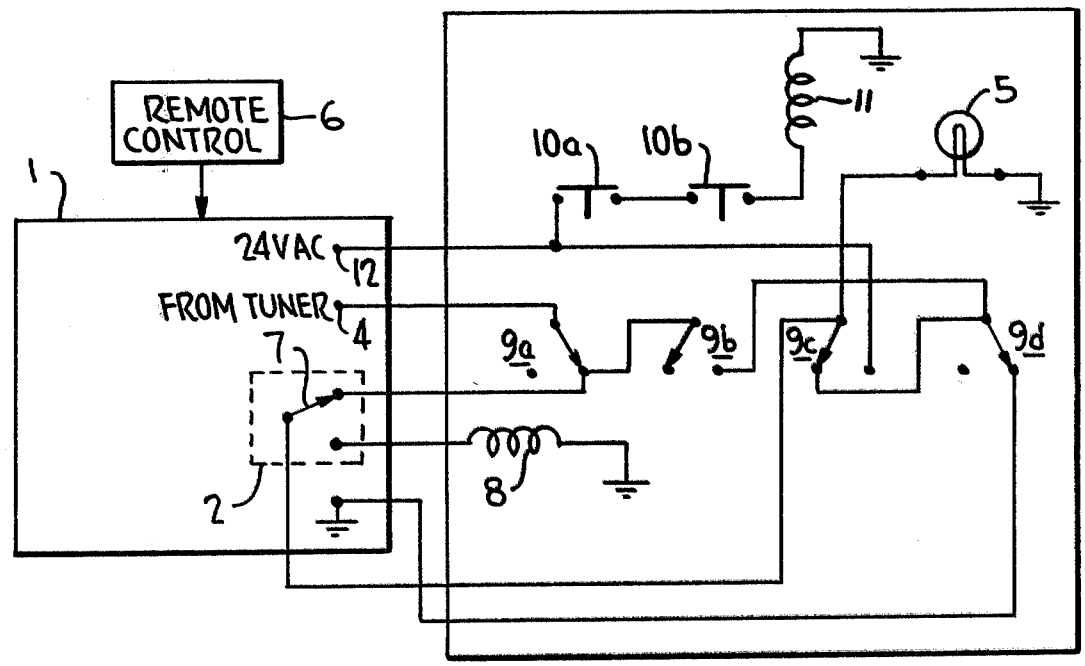
FIG. 2 is a more detailed block circuit diagram of the television system illustrated in FIG. 1, with all of the switches set in their normal, or deactivated, positions.

A television system constructed in accordance with the present invention is illustrated in FIG. 1. That system includes a television 1, a key operated switching device 2 and an override system 3. In addition, there is generally a remote control 6 for turning the television off and on once it has been switched into an operating condition and for changing channels and adjusting the volume on the television. Such remote control systems are extremely well-known in the prior art.

To understand the function of this device, it is desirable to first understand the operation of the TV and its remote control system. Assume that channel 7 is an educational channel which the hospital is offering free. When key activating switch 2 is in its off position, the user can press remote control 6 and the tuner will move from its off position on the tuner to channel 7 (ON) and stop. The set is adjusted internally to operate in this fashion. The user now can watch the free educational TV channel. If the remote control is pressed again, the tuner will go to its off position and stop. The user cannot stop at the other TV channels unless key activating switch 2 is turned on or override 3 activated.

Key operated switching system 2 includes a key operated switch 7 and a relay coil 8. Switch 7 as with all the other switches illustrated in the drawings is shown in its normal, or deactivated, position. When switch 7 is closed, relay coil 8 is energized and holds 7 in its closed position.

Override system 3 can include four basic relay switches 9a through 9d. When the tuner which is connected to contact 4 is connected to ground, the tuner is not capable of being normally used. Switches 9b, 9c, and 9d are all switched by relay coil 8 upon actuation of key operated switch 7 or upon closing of override switches 10a and 10b as discussed below.

Override system 3 includes two push-button switches 10a and 10b and a latching coil 11. When switches 10a and 10b are pushed closed, latching coil 11 is energized by 24 VAC source 12. Switches 10a and 10b are momentary contact switches, and are activated only when simultaneously depressed; by simultaneously depressing 10a and 10b, voltage is passed through latching coil 11. When latching coil 11 is activated, it switches 9a, 9b, 9c and 9d causing the ground path from the tuner to ground to be broken or opened, this is accomplished by 9a switching to the opposite contact. The 24 VAC connected to contact 12 is applied to switch 9c and has a path to indicating light 5. When the tuner ground path is opened, the tuner will stop at all channels allowing full viewing of the normal TV signals.

Once the override system is activated (by the user simultaneously depressing 10a and 10b, indicating light 5 is activated, indicating that the TV set has been rented. Depressing switches 10a and 10b once the rental light has been activated will not deactivate the current. When the rental operator sees the indicating light, he has been alerted that the television set has been activated and rented. By activating the set with the key, he will simultaneously deactivate the override system and deactivate the indicating light.

It is noted that the above description and the accompanying drawings are provided merely to present an exemplary embodiment of the present invention and that additional modifications of that embodiment are possible within the scope of this invention without deviating from the spirit thereof.

I claim:

1. A television system constructed for rental use, the television system comprising:
   actuating means including a key operated switch switchable between an off position for preventing normal operation of the television and an on position for enabling the television to be operated;
   override switching means capable of being switched from a normal position to an actuated position for overriding said key operated switch when in its off position and enabling the television to be operated; and said override switching means when switched in to its actuated position remains in said position until said key operated switch is switched into its on position; and
   indicating means for providing an indicating signal when said override switching means has been switched into its actuated position.

2. A television as defined in claim 1 wherein: said actuating means includes means for switching said override switching means from its actuated position back to its normal position when said key operated switch is switched into its on position.

3. A television as defined in claim 2 wherein said indicating means is a light and said light is turned on when said override switching means has been switched into its actuated position and said light remains on until said override switching means returns to its normal position.

4. A television as defined in claim 3 wherein: said override switching means includes a voltage source, a latching relay coil and two push-button relay switches connected in the series with said voltage source and said latching relay coil; said latching relay coil is energized when said push-button switches are closed and upon being energized retaining said push-button switches in their closed positions; and said actuating means causes said latching relay coil to be de-energized when said key operated switch is switched into its on position.

5. An override switching system for a television constructed for rental use, the television having an actuating mechanism including a key operated switch switchable between an off position for preventing normal operation of the television and an on position for enabling the television to be operated, the override switching system comprising: an override switch capable of being switched from a normal position to an actuated position for overriding said key operated switch when in its off position and enabling the television to be operated and said override switching means when switched into its actuated position remains in said position until said key operated switch is switched into its on position; and, indicating means for providing an indicating signal when said override switch has been switched into its actuated position.

6. A television system constructed for rental use, the television system comprising: actuating means utilizing a key operated switch switchable between an off position for preventing normal operation of the television and an on position for enabling normal operation of the television and override switching means for overriding the off position of said key actuated switch, said override switching means including a voltage source, a latching relay coil and two push-button relay switches connected in the series with said voltage source and said latching relay coil; said latching relay coil is energized when said push-button switches are closed and upon being energized retains said push-button switches in their closed positions; and said actuating means causes said latching relay coil to be de-energized when said key-operated switch is switched into its on position.

* * * * *